(12) United States Patent
Tyler et al.

(10) Patent No.: US 9,105,902 B2
(45) Date of Patent: Aug. 11, 2015

(54) DEVICE FOR AIDING IN THE FRACTURE OF A VENT OF AN ELECTROCHEMICAL CELL

(75) Inventors: Matt Tyler, Brown Deer, WI (US); Jason Fuhr, Sussex, WI (US)

(73) Assignee: Johnson Controls-SAFT Advanced Power Solutions LLC, Wilmington, DE (US)

( * ) Notice: Subject to any disclaimer, the term of this patent is extended or adjusted under 35 U.S.C. 154(b) by 53 days.

(21) Appl. No.: 14/126,354

(22) PCT Filed: Jun. 13, 2011

(86) PCT No.: PCT/US2011/040131
§ 371 (c)(1),
(2), (4) Date: Dec. 13, 2013

(87) PCT Pub. No.: WO2012/173588
PCT Pub. Date: Dec. 20, 2012

(65) Prior Publication Data
US 2014/0120384 A1    May 1, 2014

(51) Int. Cl.
*H01M 2/12* (2006.01)
*H01M 2/34* (2006.01)
*H01M 10/04* (2006.01)
*H01M 2/10* (2006.01)

(52) U.S. Cl.
CPC .......... *H01M 2/1241* (2013.01); *H01M 2/1223* (2013.01); *H01M 2/345* (2013.01); *H01M 10/0431* (2013.01); *H01M 2/1077* (2013.01); *H01M 2220/20* (2013.01)

(58) Field of Classification Search
CPC ...... H01M 2/12; H01M 2/1241; H01M 2/345
USPC ....................................... 429/56, 59
See application file for complete search history.

(56) References Cited

U.S. PATENT DOCUMENTS

| 4,532,705 A | 8/1985 | Zupancic et al. |
| 5,486,429 A | 1/1996 | Thibault |
| 5,830,594 A | 11/1998 | Malay |

FOREIGN PATENT DOCUMENTS

WO    2010-019764 A2    2/2010

*Primary Examiner* — Tracy Dove
(74) *Attorney, Agent, or Firm* — Fletcher Yoder, P.C.

(57) ABSTRACT

A device for aiding in the fracture of a vent of an electrochemical cell includes a main body having a first surface and a plurality of lobes extending out from the first surface of the main body such that an open space is provided between adjacent lobes. Each of the plurality of lobes are configured to make contact with the vent during deployment of the vent such that the vent completely separates from a bottom of the electrochemical cell. The open space provided between adjacent lobes is configured to allow gases from inside the electrochemical cell to pass through during deployment of the vent.

21 Claims, 14 Drawing Sheets

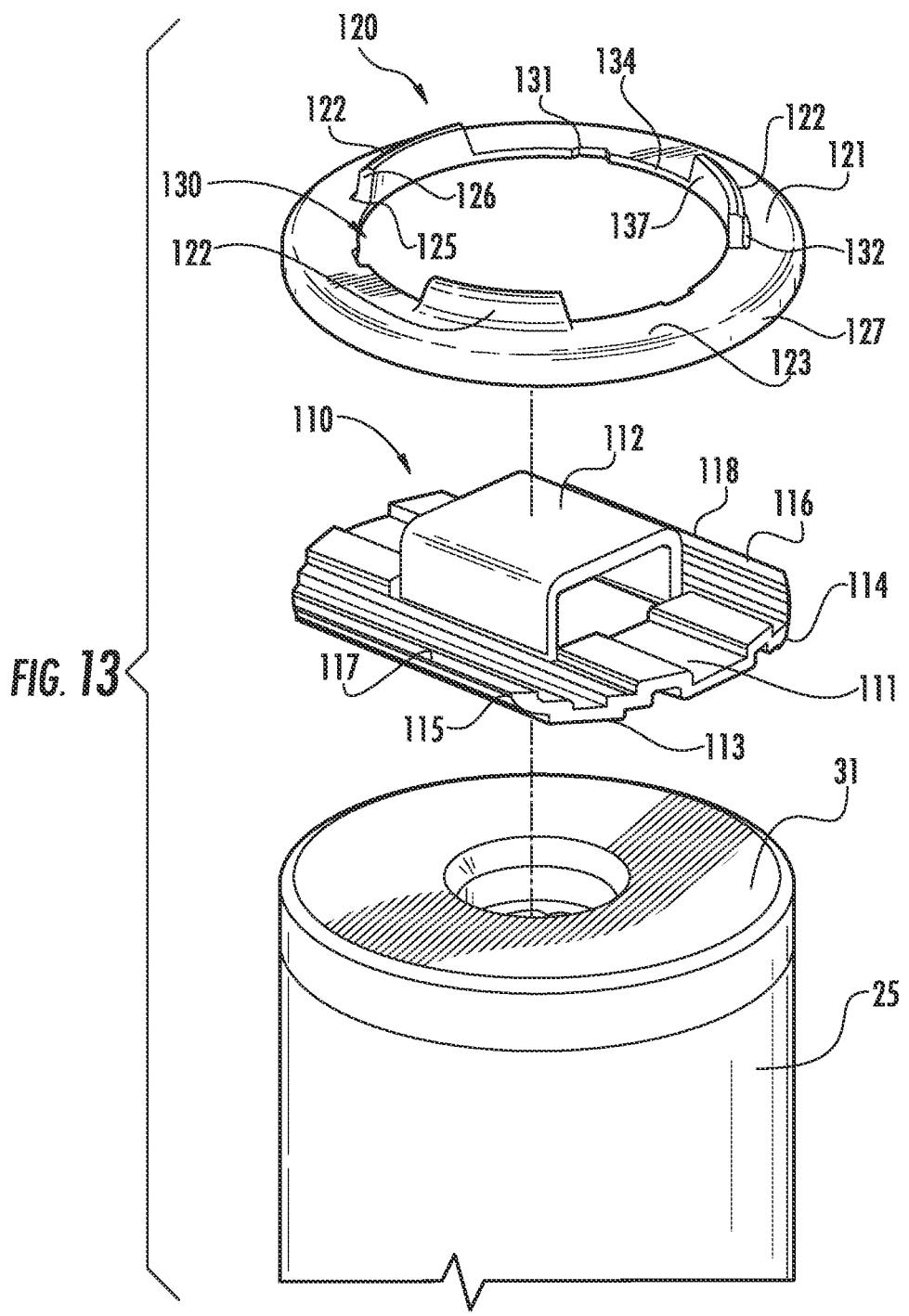

DEVICE FOR AIDING IN THE FRACTURE OF A VENT OF AN ELECTROCHEMICAL CELL

CROSS REFERENCE TO RELATED APPLICATIONS

This application claims priority from and the benefit of PCT Application No. PCT/US2011/040131, filed on Jun. 13, 2011, which is herein incorporated by reference.

BACKGROUND

The present application relates generally to the field of batteries and battery systems. More specifically, the present application relates to batteries and battery systems that may be used in vehicle applications to provide at least a portion of the motive power for the vehicle.

Vehicles using electric power for all or a portion of their motive power (e.g., electric vehicles (EVs), hybrid electric vehicles (HEVs), plug-in hybrid electric vehicles (PHEVs), and the like, collectively referred to as "electric vehicles") may provide a number of advantages as compared to more traditional gas-powered vehicles using internal combustion engines. For example, electric vehicles may produce fewer undesirable emission products and may exhibit greater fuel efficiency as compared to vehicles using internal combustion engines (and, in some cases, such vehicles may eliminate the use of gasoline entirely, as is the case of certain types of PHEVs).

As electric vehicle technology continues to evolve, there is a need to provide improved power sources (e.g., battery systems or modules) for such vehicles. For example, it is desirable to increase the distance that such vehicles may travel without the need to recharge the batteries. It is also desirable to improve the performance of such batteries and to reduce the cost associated with the battery systems.

One area of improvement that continues to develop is in the area of battery chemistry. Early electric vehicle systems employed nickel-metal-hydride (NiMH) batteries as a propulsion source. Over time, different additives and modifications have improved the performance, reliability, and utility of NiMH batteries.

More recently, manufacturers have begun to develop lithium-ion batteries that may be used in electric vehicles. There are several advantages associated with using lithium-ion batteries for vehicle applications. For example, lithium-ion batteries have a higher charge density and specific power than NiMH batteries. Stated another way, lithium-ion batteries may be smaller than NiMH batteries while storing the same amount of charge, which may allow for weight and space savings in the electric vehicle (or, alternatively, this feature may allow manufacturers to provide a greater amount of power for the vehicle without increasing the weight of the vehicle or the space taken up by the battery system).

It is generally known that lithium-ion batteries perform differently than NiMH batteries and may present design and engineering challenges that differ from those presented with NiMH battery technology. For example, lithium-ion batteries may be more susceptible to variations in battery temperature than comparable NiMH batteries, and thus systems may be used to regulate the temperatures of the lithium-ion batteries during vehicle operation. The manufacture of lithium-ion batteries also presents challenges unique to this battery chemistry, and new methods and systems are being developed to address such challenges.

It would be desirable to provide an improved battery module and/or system for use in electric vehicles that addresses one or more challenges associated with NiMH and/or lithium-ion battery systems used in such vehicles. It also would be desirable to provide a battery module and/or system that includes any one or more of the advantageous features that will be apparent from a review of the present disclosure.

SUMMARY

According to an exemplary embodiment, a device for aiding in the fracture of a vent of an electrochemical cell includes a main body having a first surface and a plurality of lobes extending out from the first surface of the main body such that an open space is provided between adjacent lobes. Each of the plurality of lobes are configured to make contact with the vent during deployment of the vent such that the vent completely separates from a bottom of the electrochemical cell. The open space provided between adjacent lobes is configured to allow gases from inside the electrochemical cell to pass through during deployment of the vent.

BRIEF DESCRIPTION OF THE DRAWINGS

FIG. 13 is a partial exploded view of the electrochemical cell of FIG. 10 showing a cell element, current collector, and pushing ring according to an exemplary embodiment.

DETAILED DESCRIPTION

Figure 1:
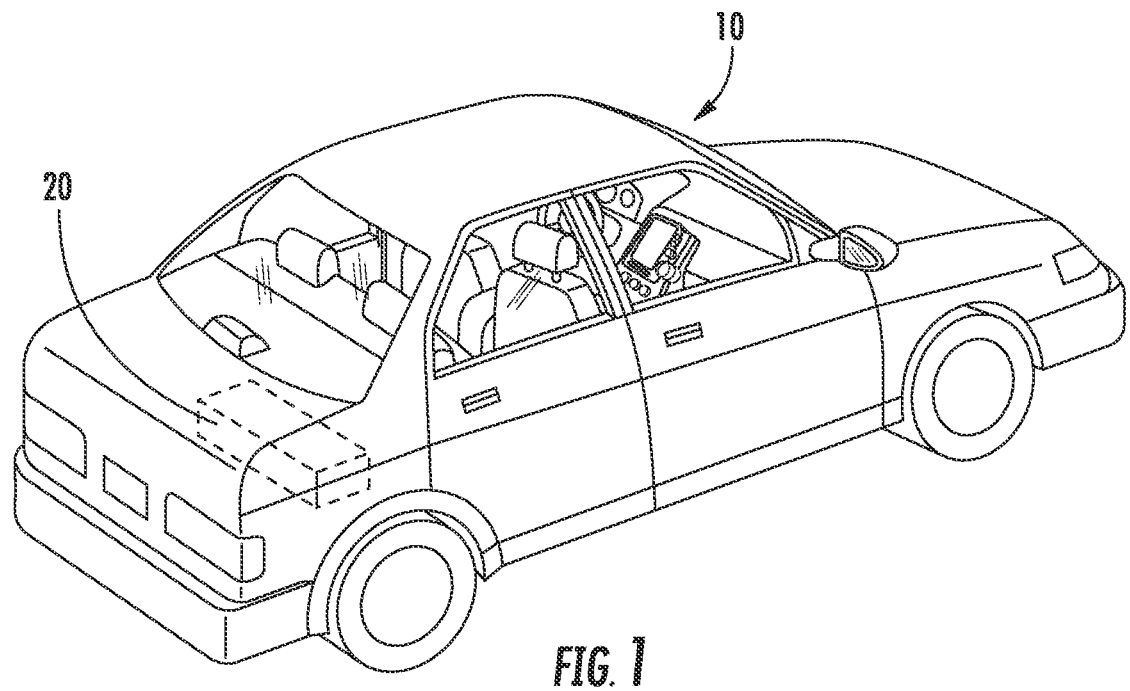
FIG. 1 is a perspective view of a vehicle including a battery system according to an exemplary embodiment.

FIG. 1 is a perspective view of a vehicle 10 in the form of an automobile (e.g., a car) having a battery system 20 for providing all or a portion of the motive power for the vehicle 10. Such a vehicle 10 can be an electric vehicle (EV), a hybrid electric vehicle (HEV), a plug-in hybrid electric vehicle (PHEV), or other type of vehicle using electric power for propulsion (collectively referred to as "electric vehicles").

Although the vehicle 10 is illustrated as a car in FIG. 1, the type of vehicle may differ according to other exemplary embodiments, all of which are intended to fall within the scope of the present disclosure. For example, the vehicle 10 may be a truck, bus, industrial vehicle, motorcycle, recreational vehicle, boat, or any other type of vehicle that may benefit from the use of electric power for all or a portion of its propulsion power.

Although the battery system 20 is illustrated in FIG. 1 as being positioned in the trunk or rear of the vehicle, according to other exemplary embodiments, the location of the battery system 20 may differ. For example, the position of the battery system 20 may be selected based on the available space within a vehicle, the desired weight balance of the vehicle, the location of other components used with the battery system 20 (e.g., battery management systems, vents, or cooling devices, etc.), and a variety of other considerations.

Figure 2:
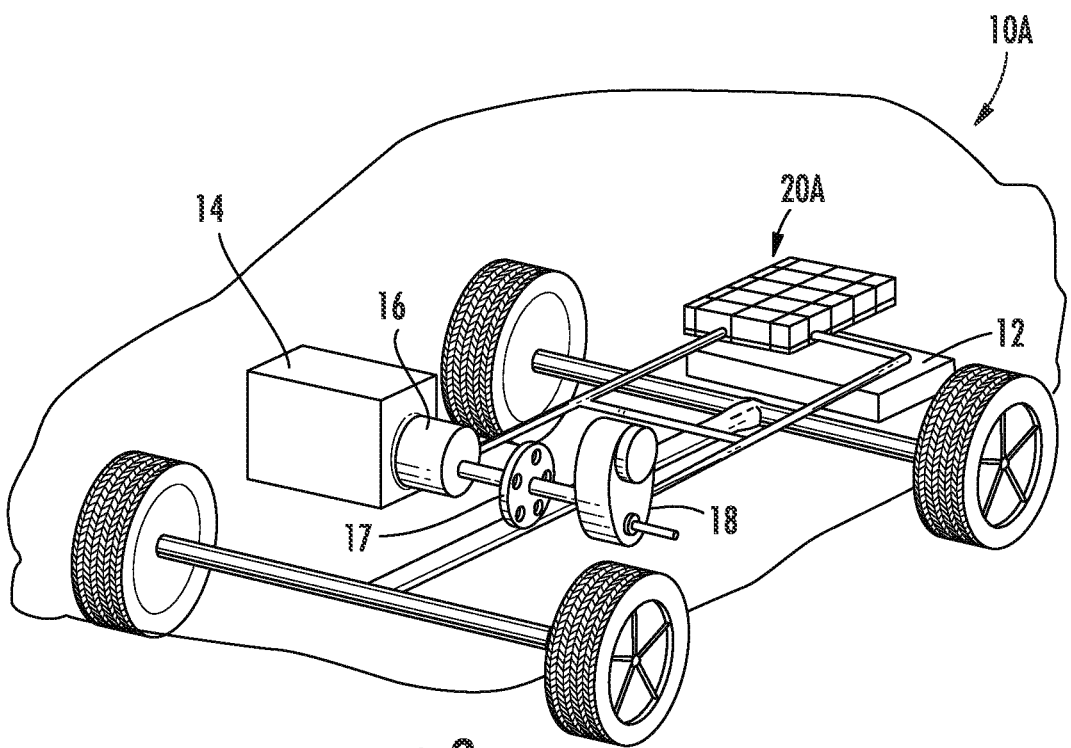
FIG. 2 is a cutaway schematic view of a vehicle including a battery system according to an exemplary embodiment.

FIG. 2 illustrates a cutaway schematic view of a vehicle 10A provided in the form of an HEV according to an exemplary embodiment. A battery system 20A is provided toward the rear of the vehicle 10A proximate a fuel tank 12 (the battery system 20A may be provided immediately adjacent the fuel tank 12 or may be provided in a separate compartment in the rear of the vehicle 10A (e.g., a trunk) or may be provided elsewhere in the vehicle 10A). An internal combustion engine 14 is provided for times when the vehicle 10A utilizes gasoline power to propel the vehicle 10A. An electric motor 16, a power split device 17, and a generator 18 are also provided as part of the vehicle drive system.

Such a vehicle 10A may be powered or driven by just the battery system 20A, by just the engine 14, or by both the battery system 20A and the engine 14. It should be noted that other types of vehicles and configurations for the vehicle drive system may be used according to other exemplary embodiments, and that the schematic illustration of FIG. 2 should not be considered to limit the scope of the subject matter described in the present application.

According to various exemplary embodiments, the size, shape, and location of the battery systems 20, 20A, the type of vehicles 10, 10A, the type of vehicle technology (e.g., EV, HEV, PHEV, etc.), and the battery chemistry, among other features, may differ from those shown or described.

Figure 3:
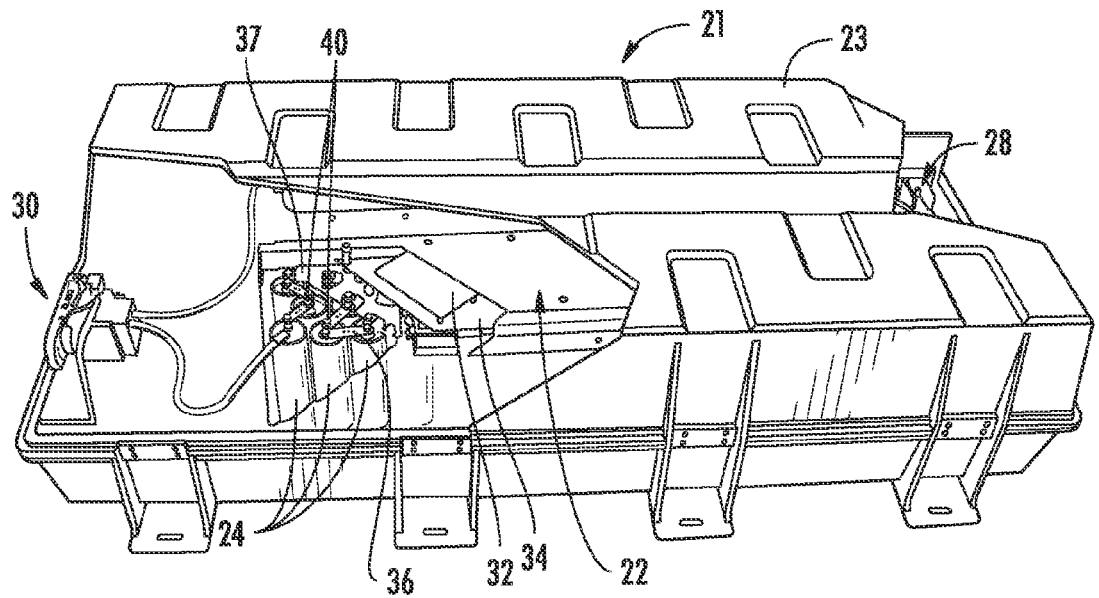
FIGS. 3-4 are partial cutaway views of a battery system according to an exemplary embodiment.
Figure 4:
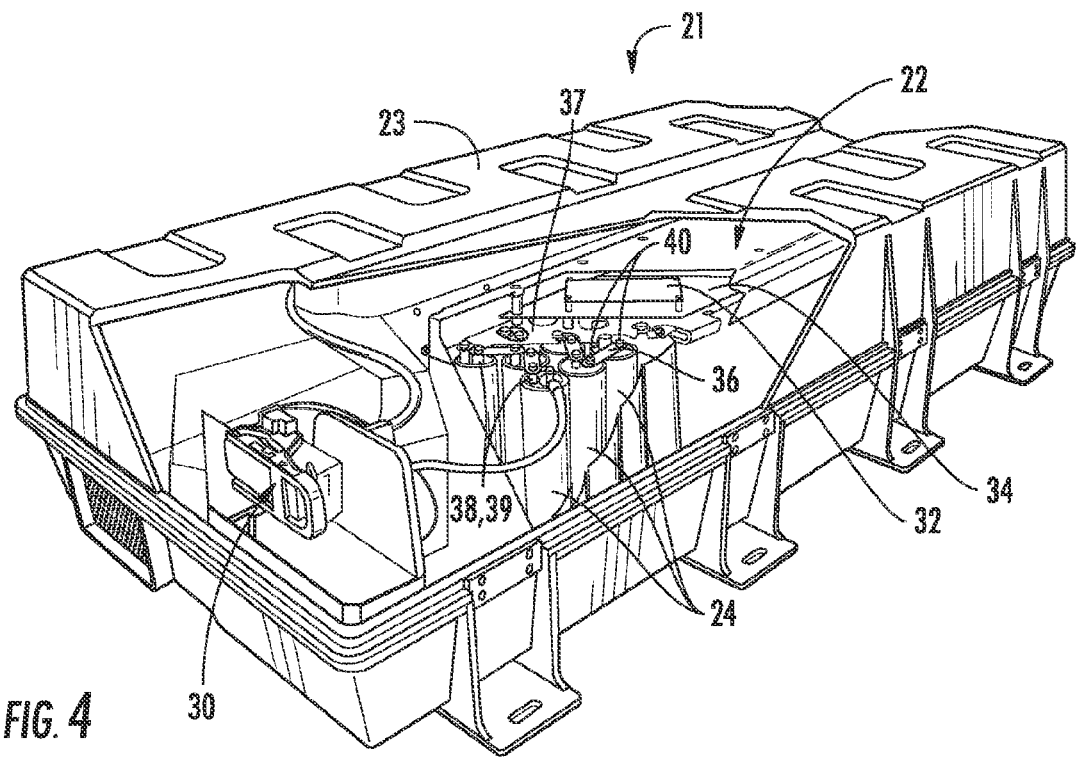
Figure 5:
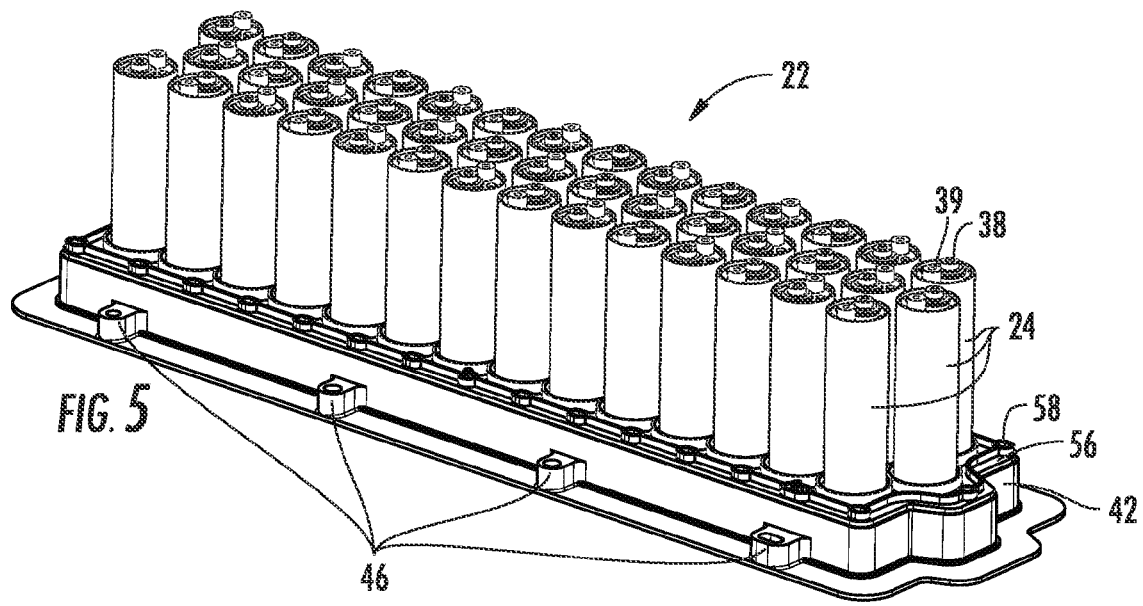
FIGS. 5-6 are isometric views of a portion of a battery module for use in a battery system according to an exemplary embodiment.
Figure 6:
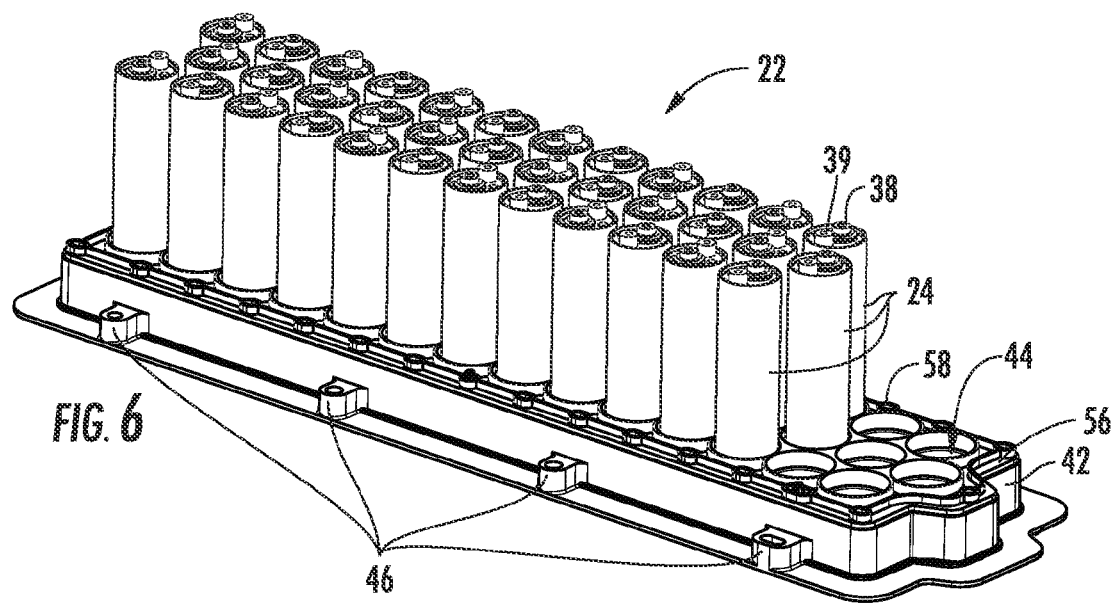

Referring now to FIGS. 3-4, partial cutaway views of a battery system 21 are shown according to an exemplary embodiment. According to an exemplary embodiment, the battery system 21 is responsible for packaging or containing electrochemical batteries or cells 24, connecting the electrochemical cells 24 to each other and/or to other components of the vehicle electrical system, and regulating the electrochemical cells 24 and other features of the battery system 21. For example, the battery system 21 may include features that are responsible for monitoring and controlling the electrical performance of the battery system 21, managing the thermal behavior of the battery system 21, containing and/or routing of effluent (e.g., gases that may be vented from a cell 24), and other aspects of the battery system 21.

According to the exemplary embodiment as shown in FIGS. 3-4, the battery system 21 includes a cover or housing 23 that encloses the components of the battery system 21. Included in the battery system are two battery modules 22 located side-by-side inside the housing 23. According to other exemplary embodiments, a different number of battery modules 22 may be included in the battery system 21, depending on the desired power and other characteristics of the battery system 21. According to other exemplary embodiments, the battery modules 22 may be located in a configuration other than side-by-side (e.g., end-to-end, etc.).

As shown in FIGS. 3-4, the battery system 21 also includes a high voltage connector 28 located at one end of the battery system 21 and a service disconnect 30 located at a second end of the battery system 21 opposite the first end according to an exemplary embodiment. The high voltage connector 28 connects the battery system 21 to a vehicle 10. The service disconnect 30, when actuated by a user, disconnects the two individual battery modules 22 from one another, thus lowering the overall voltage potential of the battery system 21 by half to allow the user to service the battery system 21.

According to an exemplary embodiment, each battery module 22 includes a plurality of cell supervisory controllers (CSCs) 32 to monitor and regulate the electrochemical cells 24 as needed. According to other various exemplary embodiments, the number of CSCs 32 may differ. The CSCs 32 are mounted on a member shown as a trace board 34 (e.g., a printed circuit board). The trace board 34 includes the necessary wiring to connect the CSCs 32 to the individual electrochemical cells 24 and to connect the CSCs 32 to the battery management system (not shown) of the battery system 21. The trace board 34 also includes various connectors to make these connections possible (e.g., temperature connectors, electrical connectors, voltage connectors, etc.).

Still referring to FIGS. 3-4, each of the battery modules 22 includes a plurality of electrochemical cells 24 (e.g., lithium-ion cells, nickel-metal-hydride cells, lithium polymer cells, etc., or other types of electrochemical cells now known or hereafter developed). According to an exemplary embodiment, the electrochemical cells 24 are generally cylindrical lithium-ion cells configured to store an electrical charge. According to other exemplary embodiments, the electrochemical cells 24 could have other physical configurations (e.g., oval, prismatic, polygonal, etc.). The capacity, size, design, and other features of the electrochemical cells 24 may also differ from those shown according to other exemplary embodiments.

Each of the electrochemical cells 24 are electrically coupled to one or more other electrochemical cells 24 or other components of the battery system 21 using connectors provided in the form of bus bars 36 or similar elements. According to an exemplary embodiment, the bus bars 36 are housed or contained in bus bar holders 37. According to an exemplary embodiment, the bus bars 36 are constructed from a conductive material such as copper (or copper alloy), aluminum (or aluminum alloy), or other suitable material. According to an exemplary embodiment, the bus bars 36 may be coupled to terminals (e.g., negative terminals 38 and positive terminals 39) of the electrochemical cells 24 by welding (e.g., resistance welding) or through the use of fasteners 40 (e.g., a bolt or screw may be received in a hole at an end of the bus bar 36 and screwed into a threaded hole in the terminal 38, 39).

Referring now to FIGS. 5-8, a portion of a battery module 22 for use in a battery system 21 is shown according to an exemplary embodiment. The battery module 22 includes a plurality of electrochemical cells 24 provided in a first member or tray 42 (e.g., structure, housing, etc.). Although illustrated in FIG. 5 as having a particular number of electrochemical cells 24 (i.e., three rows of electrochemical cells arranged such that 14 electrochemical cells are arranged in each row, for a total of 42 electrochemical cells), it should be noted that according to other exemplary embodiments, a different number and/or arrangement of electrochemical cells 24 may be used in the battery module 22 depending on any of a variety of considerations (e.g., the desired power for the battery module 22, the available space within which the battery module 22 must fit, etc.).

According to an exemplary embodiment, the tray 42 receives the individual electrochemical cells 24 in the proper orientation for assembling the battery module 22. According to an exemplary embodiment, the tray 42 may also include features to provide spacing of the cells away from the bottom of the tray and/or from adjacent cells. For example, according to an exemplary embodiment, the trays may include a series of features shown as sockets 44 (e.g., openings, apertures, etc.) to locate and hold the electrochemical cells 24 in position above the bottom of the tray 42.

As shown in FIGS. 5-8, according to another exemplary embodiment, the tray 42 may also include features shown as bosses 46 that are intended to aid in the retention of a housing or cover (not shown) to enclose and/or retain the plurality of cells 24. According to another exemplary embodiment, the bosses 46 may also aid in securing the tray 42 to the vehicle. According to an exemplary embodiment, the tray 42 may be made of a polymeric material or other suitable material (e.g., electrically insulated material).

Figure 9:
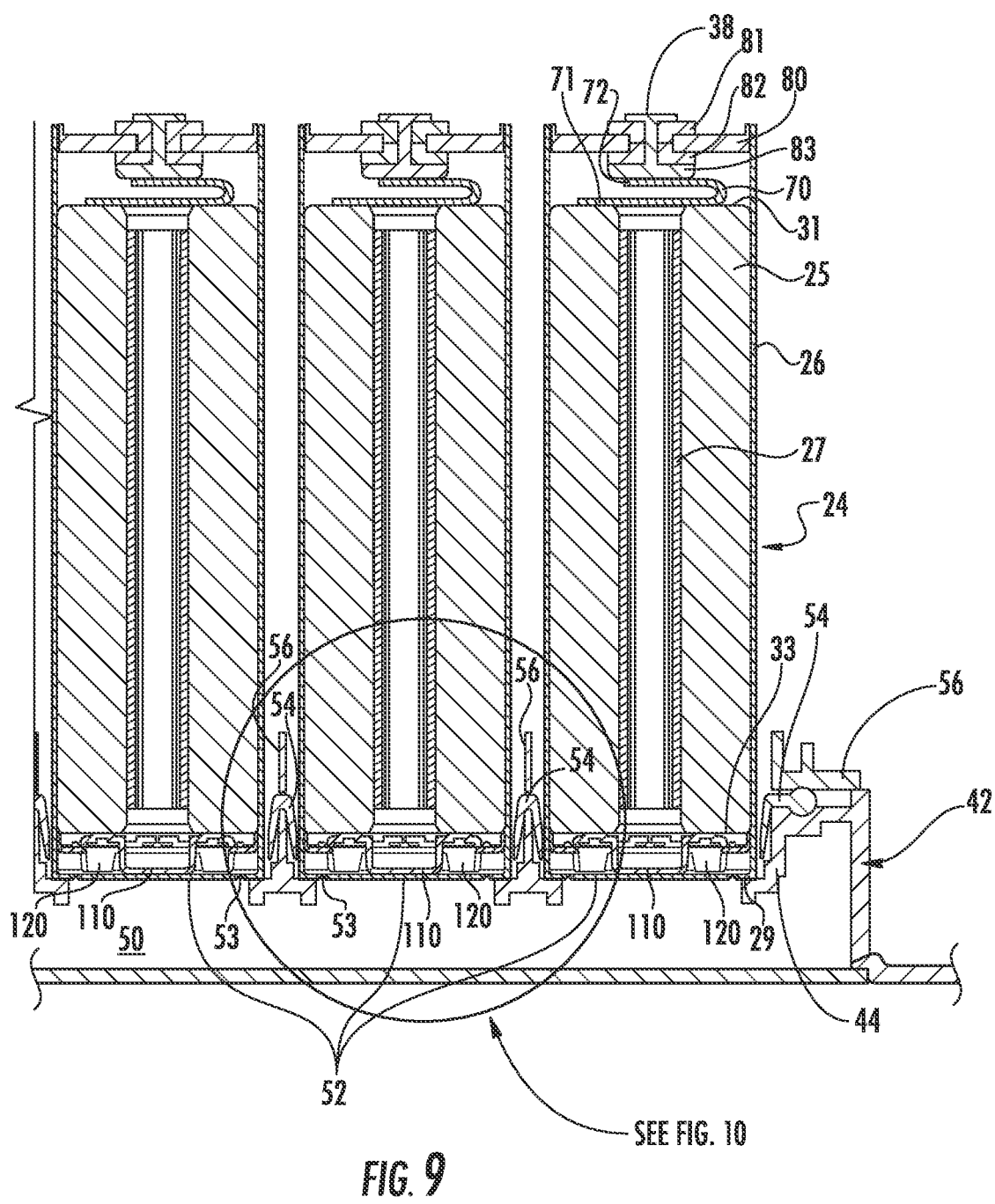
FIG. 9 is a cross-sectional view of a portion of the battery module of FIG. 8 taken along line 9-9 of FIG. 8.

According to an exemplary embodiment, the sockets 44 of the tray 42 are configured to receive (e.g., retain, hold, position, etc.) a lower end or portion of the individual electrochemical cells 24. According to an exemplary embodiment, the sockets 44 are generally circular openings having at least one step or surface 48 (e.g., as shown in FIG. 9A) configured to receive the lower portion of the electrochemical cell 24. According to other exemplary embodiments, the openings of the sockets 44 may have other shapes to receive cells of different shapes (e.g., prismatic, oval, etc.). The lower steps or surface 48 of the socket 44 positions the electrochemical cell 24 at a top portion of an airspace or chamber 50 defined by the tray 42 (e.g., as shown in FIG. 9). The chamber 50 is configured to receive gases and/or effluent that may be vented by the electrochemical cells 24 through a vent feature or vent device (e.g., vent 52 as shown in FIG. 9) of the electrochemical cell 24.

Figure 7:
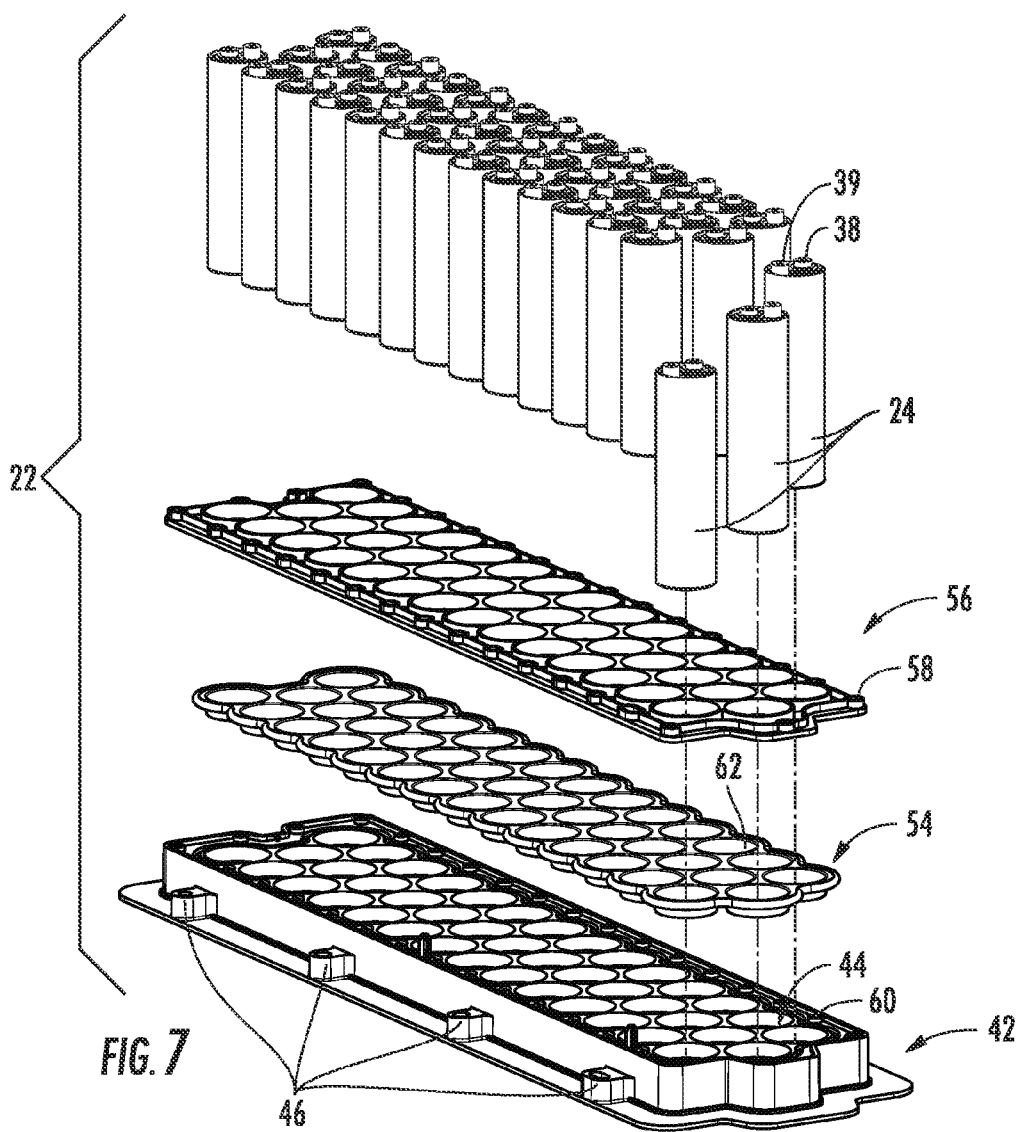
FIG. 7 is a partial exploded view of the battery module of FIG. 5.
Figure 10:
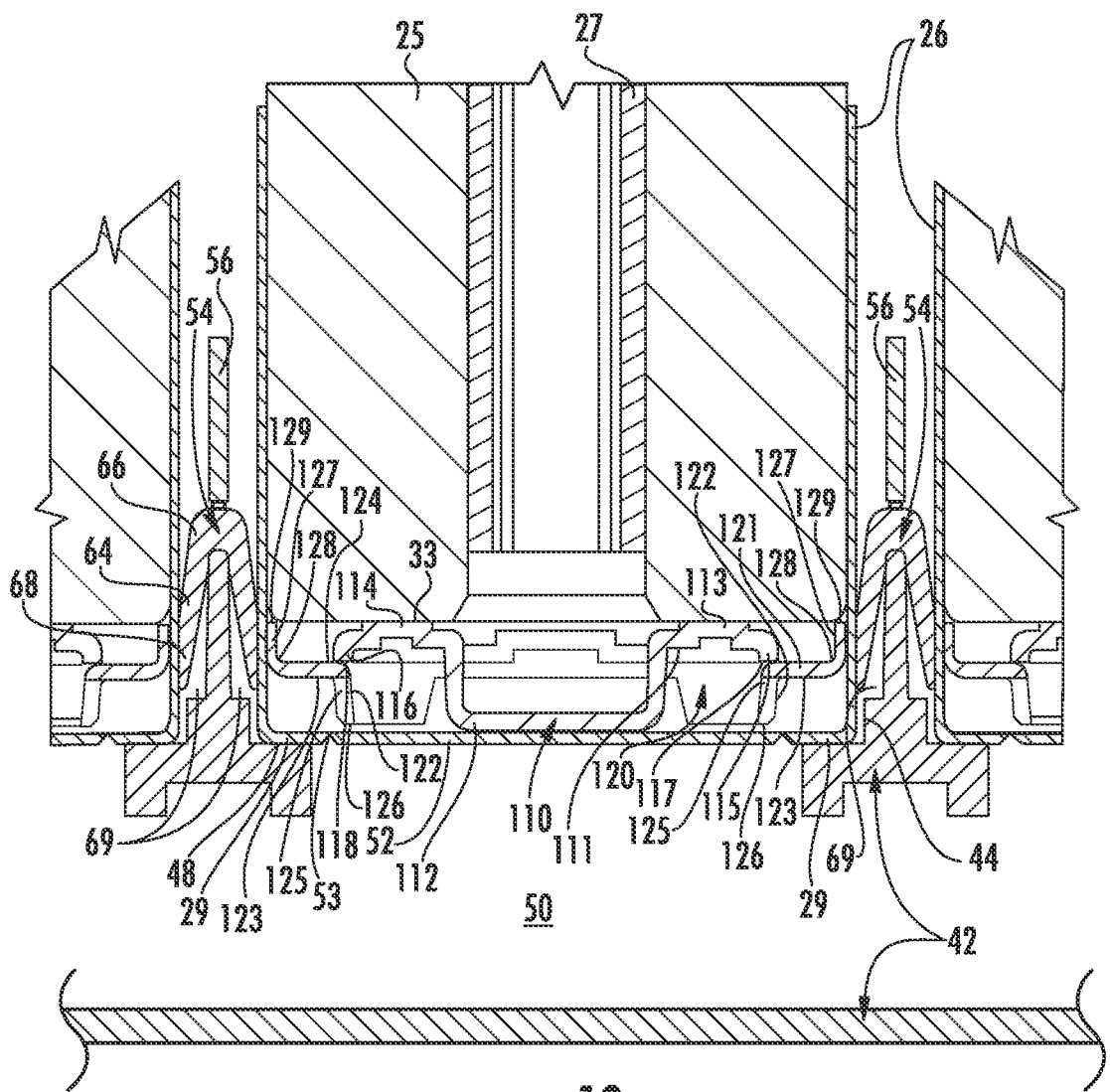
FIG. 10 is a detail view of a portion of the battery module of FIG. 9.

Referring now to FIGS. 7 and 9-10, the battery module 22 may also include a member shown as a gasket or seal 54. According to an exemplary embodiment, the seal 54 is configured to aid in sealing the lower portions of the electrochemical cells 24 in the tray 42 to help retain any gases vented from the electrochemical cells 24 into the chamber 50. According to an exemplary embodiment, the seal 54 is provided adjacent a top surface of the tray 42. According to an exemplary embodiment, the seal 54 may be constructed from a pliable, non-conductive material such as silicone. According to another exemplary embodiment, the seal 54 may be die cut from a silicone sheet or may be a molded silicone member (e.g., made by an injection molding process). According to another exemplary embodiment, the seal may be any seal that is shown and described in International Patent Application No. PCT/US2009/053697, filed Aug. 13, 2009, the entire disclosure of which is incorporated herein by reference. According to other exemplary embodiments, the seal may be any seal that is now known or developed in the future.

According to an exemplary embodiment, a member (fixture, device, plate, retainer, etc.) shown as a clamping plate 56 may be provided above the seal 54 in order to keep the seal 54 in place in relation to the tray 42. The clamping plate 56 may be coupled to the tray 42, for example, by threaded fasteners (not shown) that extend through holes 58 in the clamping plate 56 and are received by threaded holes 60 in the tray 42. According to another exemplary embodiment, the clamping plate 56 may be coupled to the tray 42 via a snap fit.

According to an exemplary embodiment, the seal 54 includes a plurality of openings 62 that align with the plurality of sockets 44 of the tray 42. As shown in FIG. 10, each of the openings 62 of the seal 54 comprise a lip portion or edge portion 64 (e.g., a deformable extension) provided in contact with an electrochemical cell 24. According to an exemplary embodiment, the edge portion 64 of the seal 54 is angled in toward the electrochemical cell 24 to provide an interference fit with the electrochemical cell 24 in order to aid in sealing the chamber 50.

According to an exemplary embodiment, the edge portion 64 of the seal 54 is thinner than the rest of the seal 54, giving the edge portion flexibility to conform to the outer diameter of the electrochemical cell 24 in order to aid in sealing in the electrochemical cell 24. According to another exemplary embodiment, the edge portion 64 of the seal 54 is tapered (e.g., as shown in FIG. 9A) from the main portion 66 of the seal 54 down to the tip 68 of the edge portion 64. This taper aids in giving the edge portion 64 the flexibility to conform to the outer diameter of the electrochemical cell 24 but still maintain the strength to allow the edge portion 64 to keep its shape over time (e.g., to minimize creep and relaxation of the seal 54 to maintain the interference fit with the electrochemical cell 24).

According to an exemplary embodiment, a space 69 is provided between the edge portion 64 of the seal 54 and each socket 44 of the tray 42 (e.g., as shown in FIG. 9A). The space 69 is connected (e.g., in fluid communication) with the chamber 50 such that when gases are vented into the chamber 50 the gases may enter the space 69 (e.g., by slipping past the bottom of the electrochemical cell 24 and the socket 44). According to an exemplary embodiment, the vented gases press the seal 54 tighter against the electrochemical cell 24 to increase the sealing characteristics of the seal 54.

Referring now to FIG. 9, each electrochemical cell 24 includes a can or housing 26 having a generally cylindrical main body (i.e., walls) and a bottom 29 at one end thereof (although this end is referred to with respect to this and other embodiments herein as "bottom," it should be understood that this could also be a "top" or "side" according to other configurations and/or depending on how the cell is oriented in a given application). The housing 26 also includes a top portion or cover 80 at an end of the housing 26 opposite the bottom 29.

According to an exemplary embodiment, the housing 26 is configured to receive a cell element 25 (e.g., a wound, cylindrical cell element). The cell element 25 includes a first electrode (e.g., a negative electrode) and a second electrode (e.g., a positive electrode) that are wound together (e.g., with separators placed in between the negative and positive electrodes) around a mandrel 27 to form a jelly-roll configuration. Additionally, according to an exemplary embodiment, the negative electrode and the positive electrode are offset (e.g., in a vertical direction) from one another such that the cell element 25 includes a negative electrode end 31 and a positive electrode end 33 opposite the negative electrode end 31.

As shown in FIG. 9, the negative electrode end 31 is conductively coupled (e.g., welded) to a first end 71 of a negative current collector 70. A second end 72 of the negative current collector 70 is coupled (e.g., welded) to a bottom portion 83 of a negative terminal 38. According to the exemplary embodiment shown in FIG. 9, the negative terminal 38 is electrically insulated from the cover 80 by a first insulator 81 and a second insulator 82. According to one exemplary embodiment, the first insulator 81 is a separate component from the second insulator 82. However, according to another exemplary embodiment, the first and second insulators may be formed as a single component. According to an exemplary embodiment, the cover 80 is conductively coupled to the housing 26 (e.g., by a welding process such as laser welding).

Figure 8:
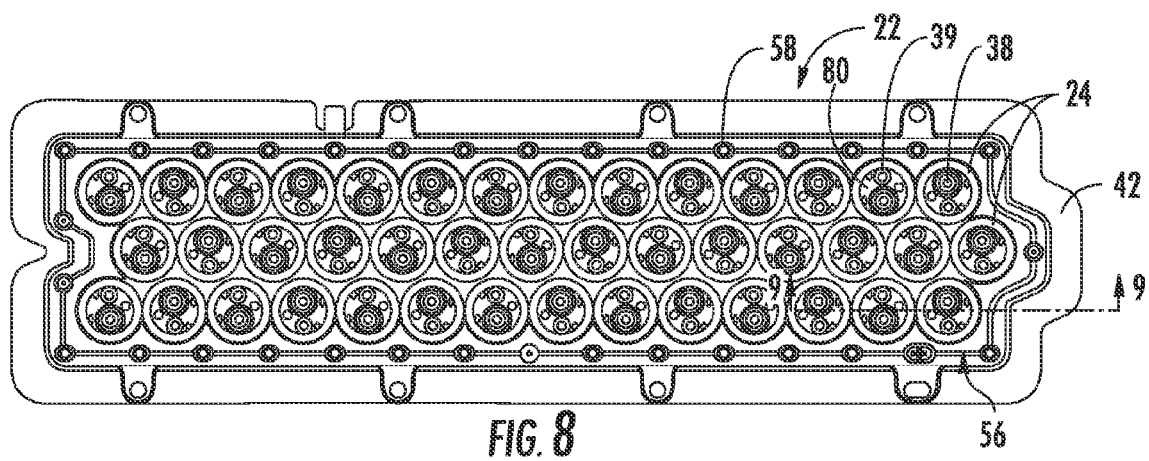
FIG. 8 is a top view of the battery module of FIG. 5.

As shown in FIGS. 9-10, the positive electrode end 33 of the cell element 25 is conductively coupled (e.g., welded) to a positive current collector 110. The positive current collector 110 in turn is conductively coupled (e.g., welded) to the bottom 29 of the housing 26, creating a conductive path from the positive electrode end 33 to the positive terminal 39 (e.g., as shown in FIG. 8) since the positive terminal 39 is conductively coupled to the cover 80. That is, the positive conductive path is from the positive electrode end 33, through the positive current collector 110, the bottom 29, the housing 26, the cover 80, and to the positive terminal 39.

Although the negative electrode end 31 is shown and described in this application as being at the top of the cell element 25 and the positive electrode end 33 is shown and described in this application as being at the bottom of the cell element 25, according to another exemplary embodiment the negative and positive electrode ends may be provided in opposite locations (as well as the respective current collectors and cell terminals).

According to an exemplary embodiment, the electrochemical cell 24 may also include a thin insulator wrap (not shown) provided around the exterior of the cell element 25 in between the cell element 25 and the housing 26. According to an exemplary embodiment, the insulator wrap conductively insulates the cell element 25 from the housing 26.

According to an exemplary embodiment, the cell 24 also includes a vent (such as, e.g., vent 52 shown in FIGS. 9-10). The vent 52 is configured to allow gases and/or effluent to exit the cell 24 once the pressure inside the cell reaches a predetermined amount (e.g., during a rise in cell temperature). When the vent 52 deploys (e.g., activates, opens, separates, etc.), the gases and/or effluent inside the cell 24 exit the cell 24 to lower the pressure inside the cell 24 (represented by arrows 140 in FIGS. 11-12). According to an exemplary embodiment, the vent 52 acts as a safety device for the cell 24 during a high pressure occurrence.

According to an exemplary embodiment, the vent 52 is located in the bottom 29 of the housing 26. According to other exemplary embodiments, the vent 52 may be located elsewhere (e.g., side of the housing, cover, etc.). According to another exemplary embodiment, the vent 52 may be located in a cover or bottom that is a separate component that is then coupled (e.g., welded) to the housing 26.

As shown in FIGS. 9-10, the vent 52 includes at least one annular or circular groove 53 (ring, trough, pressure point, fracture point, fracture ring, etc.). As shown in FIG. 10, the groove 53 has an upside down V-shaped configuration. According to other exemplary embodiments, the bottom of the groove 53 may have another shape and/or configuration (e.g., rounded shape, curved shape, upside down U-shape, etc.). According to an exemplary embodiment, the vent 52 is configured to break away (i.e., separate) from the bottom 29 of the housing 26 at the groove 53 when the vent 52 deploys.

According to an exemplary embodiment, the vent 52 is formed by tooling located external the housing 26. The tooling tolerance is only affected by one side of the tool, allowing for a more consistent groove 53, resulting in a more consistent and repeatable opening of the vent 52. The depth, shape, and size of the groove 53 may be easily modified simply by changing the tooling. Additionally, the vent 52 is easy to clean and inspect since the vent 52 (and groove 53) is located on an external side of the housing 26. For example, the groove 53 may be inspected by a laser (e.g., to measure the size of the groove 53) from the outside of the cell.

By having the vent 52 separate from the bottom 29 of the housing 26, the vent 52 acts as a current interrupt or current disconnect device. This is because the separation of the vent 52 from the bottom 29 of the housing 26 disrupts the flow of current from the positive electrode of the cell element 25 (through the positive current collector 110) to the housing 26. In this way, the vent 52 acts not only as an over-pressure safety device, but also as a current disconnect device.

According to an exemplary embodiment, the cell element 25 moves (e.g., toward the vent 52) within the housing 26 due to an increase in pressure within the housing 26 to help deploy the vent 52. For example, the cell element 25 "pushes" or "punches" the positive current collector 110 through the bottom 29 of the housing 26 to aid in the fracture of the groove 53 of the vent 52. However, the vent 52 may on occasion only partially separate (i.e., not fully separate) from the bottom 29 of the housing 26. To aid in the full separation of the vent 52 from the bottom 29 of the housing 26, the electrochemical cell 24 may include a device such as a pushing ring (e.g., such as pushing ring 120, 220, 320, 420, 520, and 620 as shown in FIGS. 9-26).

Referring to FIGS. 10-17, a pushing ring 120 for the electrochemical cell 24 is shown according to an exemplary embodiment. The pushing ring 120 includes a main body 121 having a first surface 123 and a second surface 124 opposite the first surface 123. According to one exemplary embodiment, the main body 121 of the pushing ring 120 is in the shape of an annulus; however, according to other exemplary embodiments, the main body 121 may have a different shape.

According to one exemplary embodiment, the pushing ring 120 includes a plurality of projections or lobes 122 that extend out and way from the first surface 123 of the main body 121. According to the exemplary embodiment shown in FIGS. 10-17, the pushing ring 120 includes three lobes 122. However, according to other exemplary embodiments, the pushing ring 120 may include a greater or lesser number of lobes. Each lobe 122 includes a first end 125 coupled to the first surface 123 of the main body 121 and a second end 126 (e.g., a free end) opposite the first end 125.

According to an exemplary embodiment, the lobes 122 of the pushing ring 120 are spaced apart from one another such that openings or intermediate spaces 130 between the lobes 122 are formed (e.g., as shown in FIG. 13). These openings 130 are configured to allow effluent and/or gases that may be vented from the electrochemical cells 24 to exit through the openings 130. According to an exemplary embodiment, the lobes 122 are evenly spaced along the first surface 123 of the pushing ring 120. However, according to other exemplary embodiments, the lobes 122 are not evenly spaced along the first surface 123 of the pushing ring 120.

According to an exemplary embodiment, the lobes 122 are provided adjacent an aperture or opening 134 of the pushing ring 120. As shown in FIG. 13, a first side 137 of each of the lobes 122 is in line (e.g., flush) with the opening 134. However, according to other exemplary embodiments, the first sides 137 of the lobes 122 may not be in line with the opening 134 (e.g., the lobes 122 may be provided a predetermined distance away from the opening 134). According to an exemplary embodiment, the lobes 122 have a curved or arcuate shape or profile. However, according to other exemplary embodiments, the lobes 122 may have a different shape (e.g., the lobes 122 may be straight).

According to an exemplary embodiment, the pushing ring 120 includes an extension or ring 127 (e.g., as shown in FIGS. 9-17) having a first end 128 that is coupled to the second surface 124 of the main body 121 and a second end 129 opposite the first end 128. According to one exemplary embodiment, the extension or ring 127 is a continuous ring. However, according to other exemplary embodiments, the extension or ring 127 may not be continuous (i.e., the extension or ring 127 may include multiple, discontinuous lobes or projections).

Figure 17:
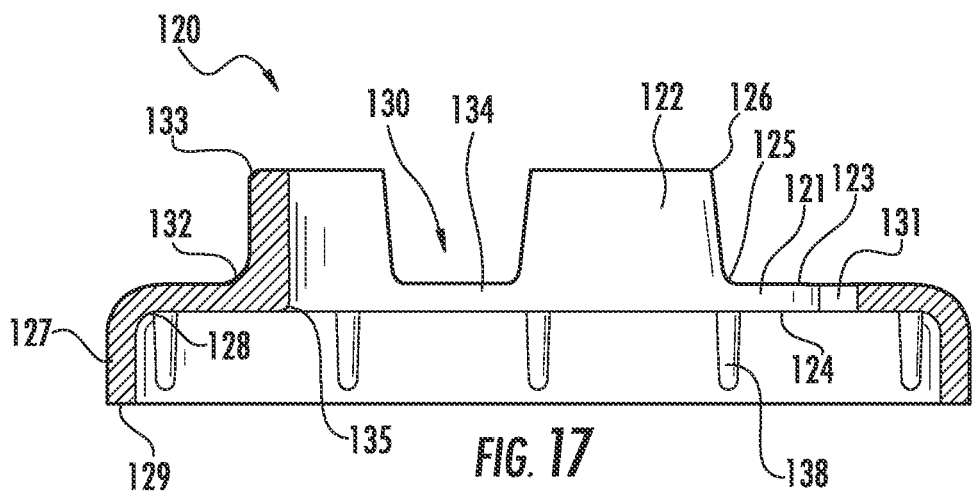
FIG. 17 is a cross-sectional view of the pushing ring of FIG. 16 taken along line 17-17 of FIG. 16 according to an exemplary embodiment.

According to an exemplary embodiment, the pushing ring 120 includes rounded edges or surfaces shown as features 132, 133, and 135 (such as, e.g., shown in FIG. 17). However, according to other exemplary embodiments, the pushing ring 120 may not include rounded edges or surfaces (i.e., the edges of the pushing ring may be square).

According to the exemplary embodiment shown in FIGS. 13-17, the pushing ring 120 includes multiple features shown as recesses 131 that are configured to aid in manufacturing the pushing ring 120. For example, the recesses 131 may aid in injection molding the pushing ring 120. According to other exemplary embodiments, the pushing ring 120 may include other features for injection molding or other manufacturing processes.

According to an exemplary embodiment, the pushing ring 120 is configured to work in conjunction with a current collector (such as, e.g., the positive current collector 110 shown in FIGS. 10-15). According to an exemplary embodiment, the positive current collector 110 includes a main body 111 having a first member or projection 112 extending out and away from the main body 111. According to an exemplary embodiment, the first projection 112 has a square or rectangular surface. However, according to other exemplary embodiments, the first projection 112 may have a different shape (e.g., circular, oval, polygonal, etc.).

According to an exemplary embodiment, the main body 111 also includes a second member or projection 113 and a third member or projection 114, both extending out and away from the main body 111 in a direction opposite that of the first projection 112. As can be seen in FIGS. 10-12 and 14, it is along the second and third projections 113, 114 that the positive current collector 110 is coupled (e.g., welded) to the positive electrode end 33 of the cell element 25.

Figure 14:
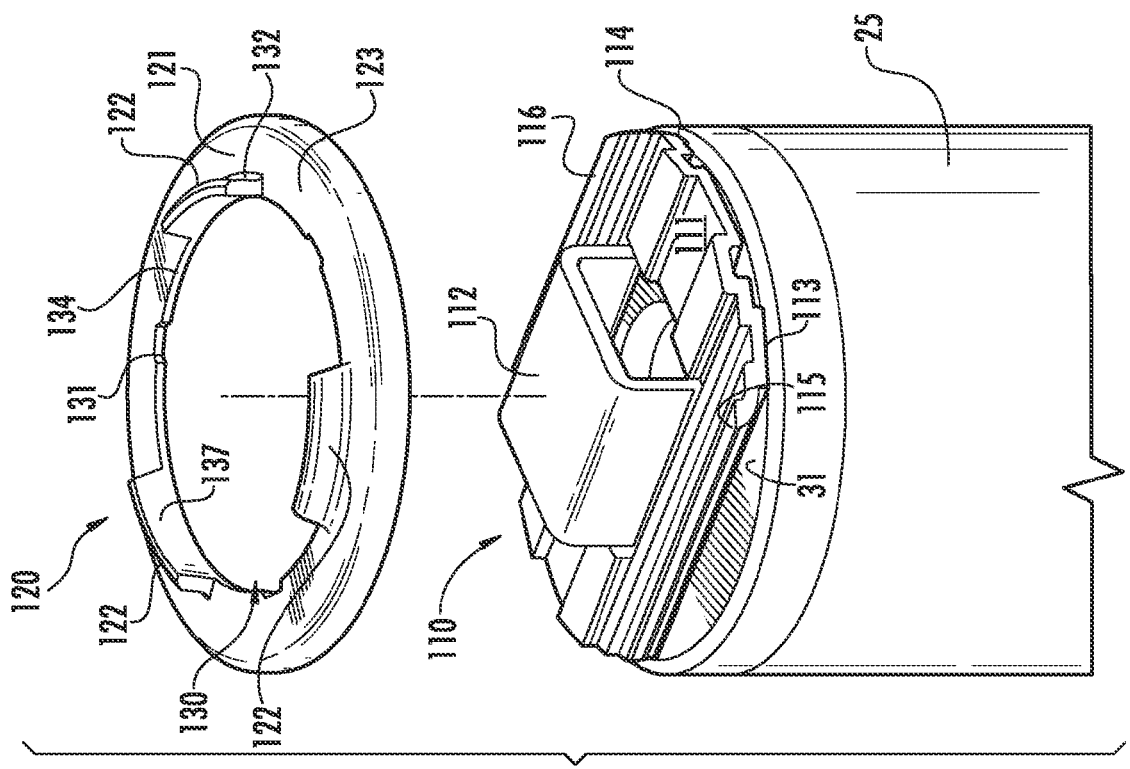
FIG. 14 is a partial exploded view of the electrochemical cell of FIG. 13 showing the current collector coupled to the cell element according to an exemplary embodiment.
Figure 16:
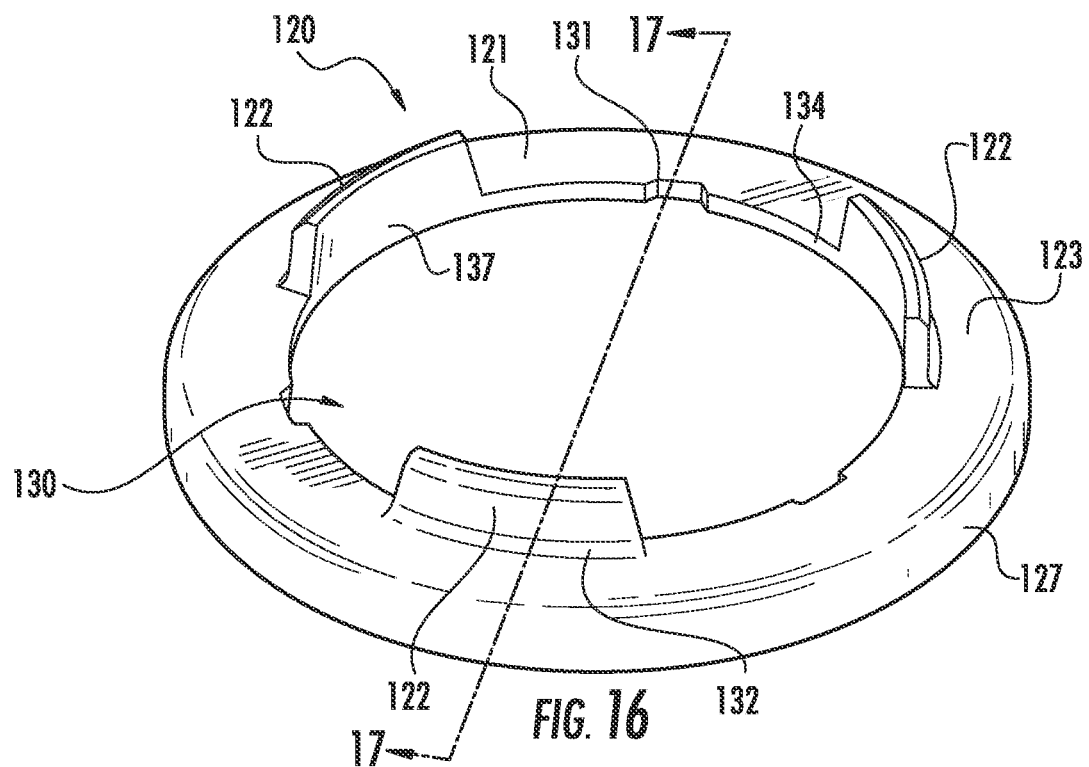
FIG. 16 is a detail perspective view of the pushing ring of FIG. 13 according to an exemplary embodiment.

According to an exemplary embodiment, the main body 111 of the positive current collector 110 also includes a first edge portion 115 having a tip 117 and a second edge portion 116 having a tip 118. As seen in FIGS. 13-14, the edge portions 115, 116 extend generally along the entire length of the main body 111. Additionally, it is the tips 117, 118 of the edge portions 115, 116 that contact the second surface 124 of the main body 121 of the pushing ring 120 when the pushing ring 120 is provided in place over the positive current collector 110 (e.g., as shown in FIGS. 10-12).

Figure 11:
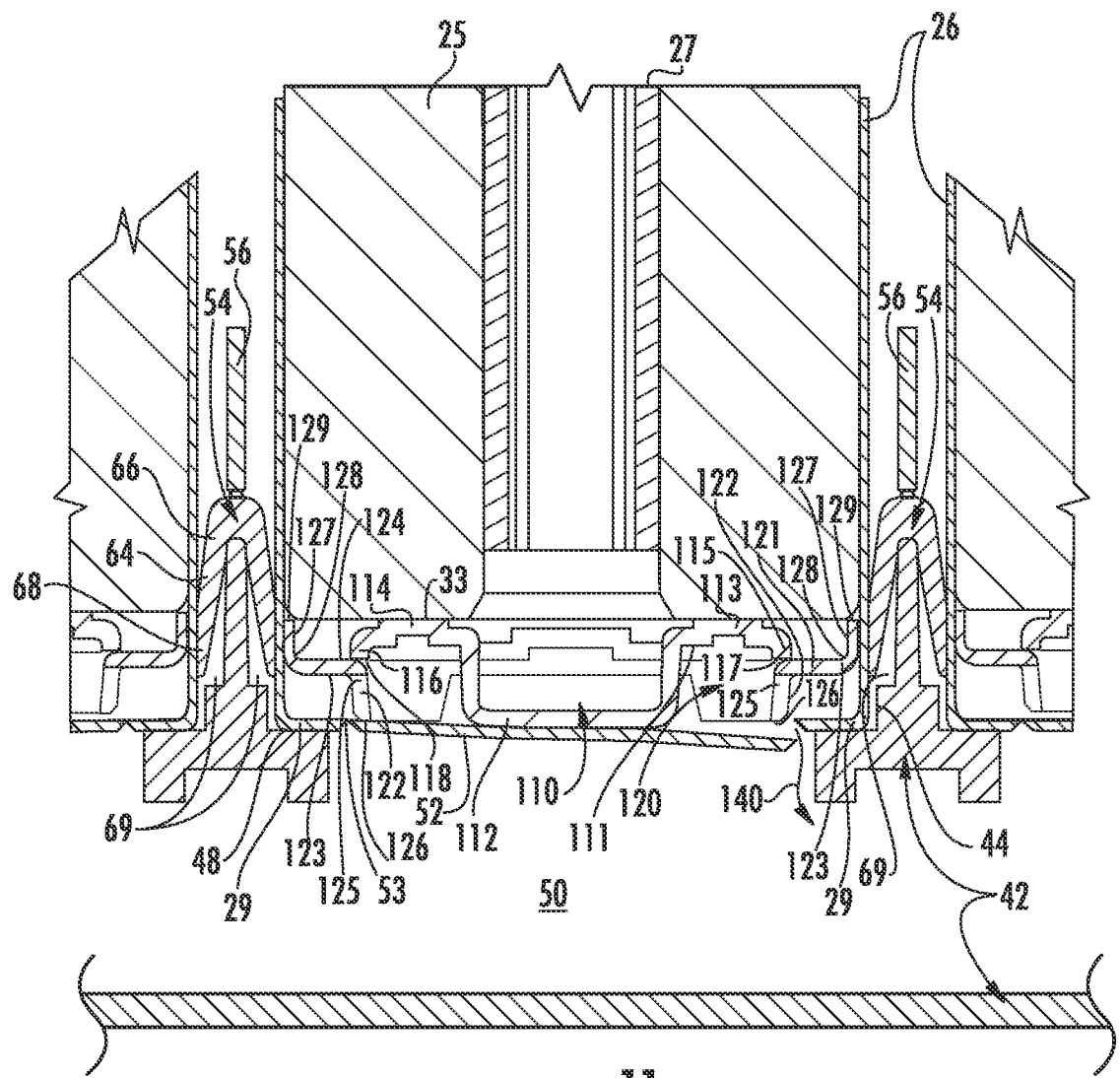
FIG. 11 is a detail view of the portion of the electrochemical cell of FIG. 10 showing the vent in a partial deployed state according to an exemplary embodiment.
Figure 12:
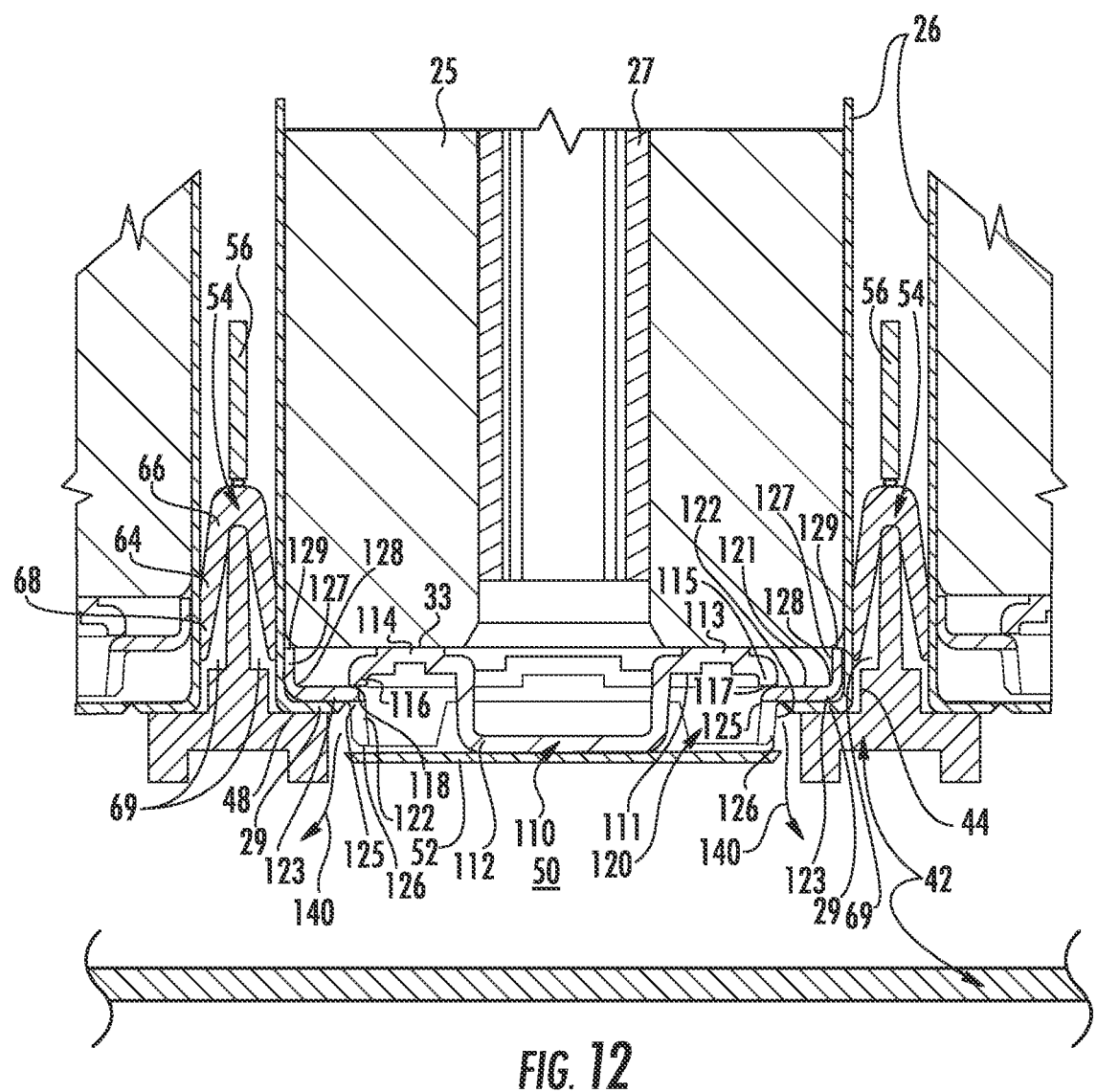
FIG. 12 is a detail view of the portion of the electrochemical cell of FIG. 10 showing the vent in a deployed state according to an exemplary embodiment.

As shown in FIGS. 10-12, the pushing ring 120 is provided between the end (e.g., positive electrode end 33) of the cell element 25 and the vent 52. Additionally, the pushing ring 120 and the positive current collector 110 have a complimentary shape with one another such that the pushing ring 120 fits over and around the positive current collector 110.

According to an exemplary embodiment, the pushing ring 120 includes features 138 (such as, e.g., shown in FIG. 17) along an inner surface of the extension or ring 127 that project or protrude out and away from the extension or ring 127 to aid in securing the pushing ring 120 to the positive current collector 110 (e.g., to the outside circumference of the main body 111 of the current collector 110). For example, the features 138 may be configured for a slight interference fit with the outside circumference of the main body 111 of the current collector 110. As shown in FIG. 17, the features 138 have a generally cylindrical shape; however, according to other exemplary embodiments, the features 138 may have a different shape.

Figure 15:
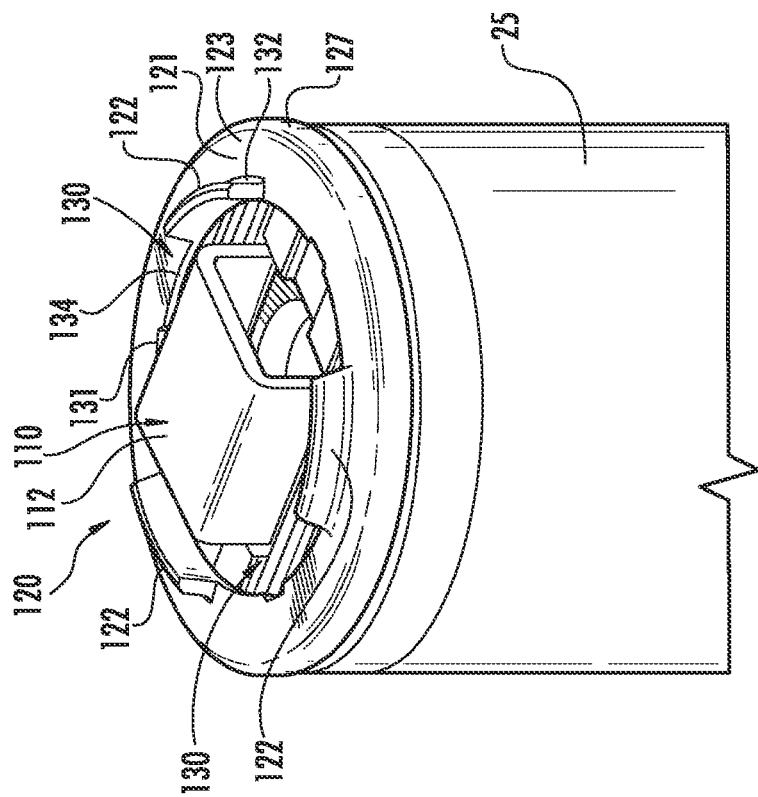
FIG. 15 is a partial perspective view of the electrochemical cell of FIG. 14 showing the pushing ring provided over the current collector according to an exemplary embodiment.

As seen in FIGS. 10 and 15, the first projection 112 of the positive current collector 110 extends a predetermined distance out from the second ends 126 of the lobes 122. This is to create a gap or space between the second ends 126 of the lobes 122 and the top surface of the vent 52 during operation of the electrochemical cell 24 (such that the lobes 122 do not push on the vent 52 during operation of the cell 24, such as, e.g., shown in FIG. 10). However, according to other exemplary embodiments, the first projection 112 of the positive current collector 110 and the second ends 126 of the lobes 122 of the pushing ring 120 may extend to the same height.

As shown in FIG. 11, according to an exemplary embodiment, when the cell element 25 begins to move (e.g., due to a pressure increase in the cell 24), the tips 117, 118 of the projections 115, 116 of the positive current collector 110 push on the second surface 124 of the pushing ring 120. Additionally, according to an exemplary embodiment, the second end 129 of the extension or ring 127 may be in contact with the positive electrode end 33 of the cell element 25 to also move the pushing ring 120.

As shown in FIG. 11, according to an exemplary embodiment, only one side (e.g., the right side) of the vent 52 has initially separated from the bottom 29 of the housing 26. As the cell element 25, positive current collector 110, and pushing ring 120 move towards the vent 52, the second ends 126 of the lobes 122 of the pushing ring 120 contact a perimeter or outer edge (e.g., as shown in FIG. 11, the left side) of the vent 52 close to or adjacent the groove 53 to ensure that the vent 52 fully and completely separates from the bottom 29 of the housing 26. As can be seen in FIG. 11, the vent 52 may bend or deflect when separating from the bottom 29 of the housing 26.

It should be noted that the second ends 126 of the lobes 122 of the pushing ring 120 will contact any part of the vent 52 that has not yet separated from the bottom 29 of the housing 26, and that FIG. 11 shows only one example of how the vent 52 may initially separate from the bottom 29 of the housing 26. For example, the second ends 126 of the lobes 122 of the pushing ring 120 may contact the right side of the vent 52 if the right side has not yet separated from the bottom 29 of the housing 26. Additionally, the second ends 126 of the lobes 122 of the pushing ring 120 may contact both the right and left sides of the vent 52 if the right and left sides have not yet separated from the bottom 29 of the housing 26. It should also be noted that the terms "left" and "right" are relative to FIG. 11 and that, depending on the rotational orientation of the cell 24, the second ends 126 of the lobes 122 of the pushing ring 120 may contact any portion along the full 360 degree circumference of the end of the cell 24.

As shown in FIG. 12, the vent 52 has completely separated from the bottom 29 of the housing 26. Thus, the vent 52 is no longer in electrical or conductive contact with the housing 26 and current flow through the cell 24 has been stopped. Additionally, as can be seen in FIG. 12, the vent 52 has gone back to its original shape (i.e., the vent 52 is no longer bent or deformed as shown in FIG. 11 during the venting event).

Further, as can be seen in FIG. 12, the first surface 123 of the pushing ring 120 is now resting (e.g., in contact with) an interior surface of the bottom 29 of the housing 26, providing a stop to the downward movement of the cell element 25.

Referring now to FIGS. 18-26, several variations of a pushing ring for use with an electrochemical cell (e.g., electrochemical cell 24) are shown according to various exemplary embodiments. According to an exemplary embodiment, the pushing rings shown in FIGS. 18-26 function in a manner generally similar to that of the pushing ring 120 shown in FIGS. 10-17 and described above.

Figure 18:
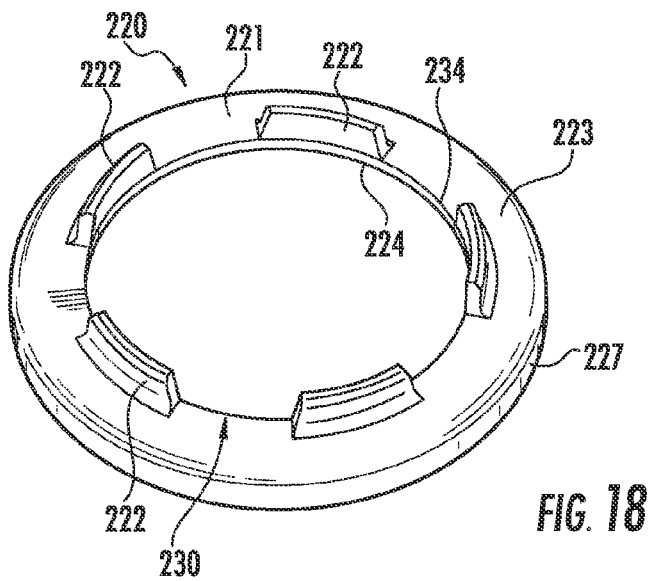
FIGS. 18-21 and 24 are detail perspective views of a pushing ring according to various other exemplary embodiments.

Referring now to FIG. 18, a pushing ring 220 is shown according to another exemplary embodiment. According to this exemplary embodiment, the pushing ring 220 includes certain features similar to the pushing ring 120 shown in FIGS. 13-17 (with similar features labeled with corresponding reference numbers in the 200 series).

For example, the pushing ring 220 includes a main body 221, a first surface 223 and a second surface 224 opposite the first surface 223. The pushing ring 220 also includes an extension or ring 227 extending out and away from the second surface 224 of the main body 221.

According to an exemplary embodiment, the pushing ring 220 includes a plurality of lobes 222 extending out and away from the first surface 223 of the main body 221. According to the exemplary embodiment shown in FIG. 18, there are a total of five lobes 222. However, according to other exemplary embodiments, the pushing ring 220 may have a greater or lesser number of lobes 222. The lobes 222 are provided adjacent an aperture or opening 234 and are spaced apart from one another such that intermediate spaces or openings 230 are provided in between adjacent lobes 222. According to an exemplary embodiment, the lobes 222 are evenly spaced along the first surface 223 of the pushing ring 220. However, according to other exemplary embodiments, the lobes 222 are not evenly spaced along the first surface 223 of the pushing ring 220.

Figure 19:
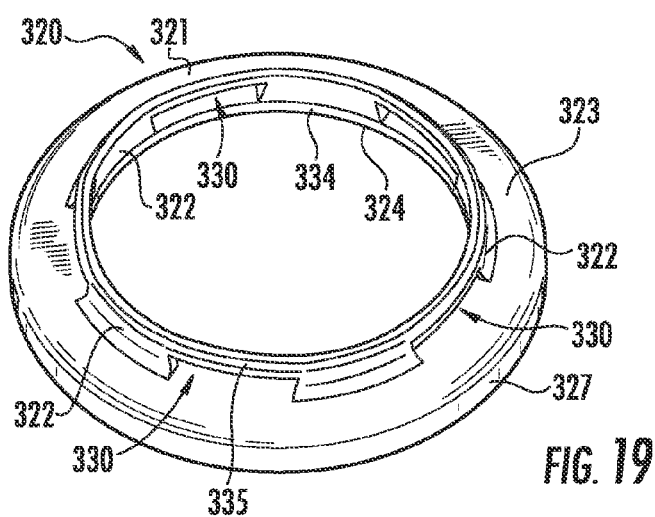

Referring now to FIG. 19, a pushing ring 320 is shown according to another exemplary embodiment. According to this exemplary embodiment, the pushing ring 320 includes certain features similar to the pushing ring 220 shown in FIG. 18 (with similar features labeled with corresponding reference numbers in the 300 series).

For example, the pushing ring 320 includes a main body 321, a first surface 323 and a second surface 324 opposite the first surface 323. The pushing ring 320 includes a plurality of lobes 322 extending out and away from the first surface 323 of the main body 321. According to the exemplary embodiment shown in FIG. 19, there are a total of five lobes 322. However, according to other exemplary embodiments, the pushing ring 320 may have a greater or lesser number of lobes 322. According to an exemplary embodiment, the lobes 422 are evenly spaced along the first surface 423 of the pushing ring 420. However, according to other exemplary embodiments, the lobes 422 are not evenly spaced along the first surface 423 of the pushing ring 420.

As shown in FIG. 19, the lobes 322 are provided adjacent an aperture or opening 334 and are spaced apart from one another such that intermediate spaces or openings 330 are provided in between adjacent lobes 322. The pushing ring 320 also includes an extension or ring 327 extending out and away from the second surface 324 of the main body 321.

According to the exemplary embodiment shown in FIG. 19, the pushing ring 320 includes features or members shown as connecting portions 335. Each connecting portion 335 connects a top portion of a first lobe 322 to a top portion of an adjacent or second lobe 322. The connecting portions 335, along with the respective sides of adjacent lobes 322, help to define each of the openings 330 between each of the lobes 322. As shown in FIG. 19, there are five openings 330; however, according to other exemplary embodiments, there may be a greater or lesser number of openings 330 in correlation with the number of lobes 322.

Figure 20:
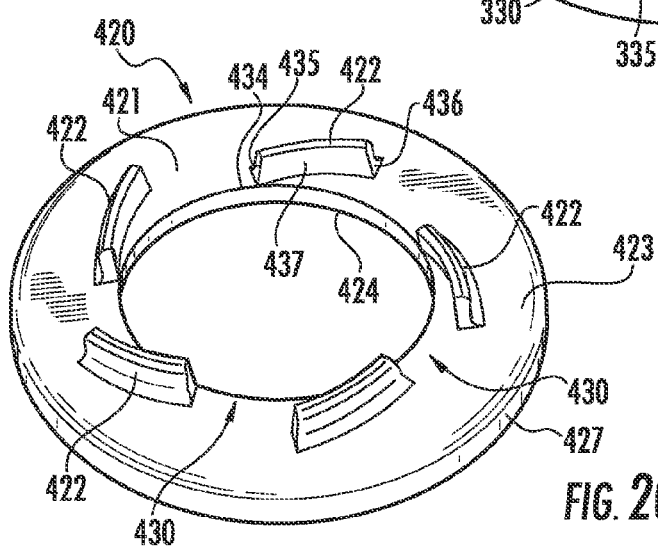

Referring now to FIG. 20, a pushing ring 420 is shown according to an exemplary embodiment. According to this exemplary embodiment, the pushing ring 420 includes certain features similar to the pushing ring 220 shown in FIG. 18 (with similar features labeled with corresponding reference numbers in the 400 series).

For example, the pushing ring 420 includes a main body 421, a first surface 423 and a second surface 424 opposite the first surface 423. The pushing ring 420 also includes a plurality of lobes 422 extending out and away from the first surface 423 of the main body 421. According to the exemplary embodiment shown in FIG. 20, there are a total of five lobes 422. However, according to other exemplary embodiments, the pushing ring 420 may have a greater or lesser number of lobes 422. The pushing ring 420 includes an extension or ring 427 extending out and away from the second surface 424 of the main body 421.

According to an exemplary embodiment, each of the lobes 422 includes a leading edge 435 and a trailing edge 436. According to an exemplary embodiment, each leading edge 435 of the lobes 422 is provided adjacent an aperture or opening 434 of the pushing ring 420. Additionally, each of the trailing edges 436 of the lobes 422 is provided a predetermined distance away from the aperture or opening 434 of the pushing ring 420. That is, the trailing edges 436 are offset from the aperture or opening 434 (and thus, are also offset from the leading edges 435).

According to an exemplary embodiment, the offset configuration of the lobes 422 helps to generate a rotation or twisting action of the pushing ring 420 when effluent and/or gas is vented from the electrochemical cell that the pushing ring 420 is provided in. According to an exemplary embodiment, the rotation of the pushing ring 420 translates into a rotation of the current collector (e.g., such as the current collector 110 shown in FIG. 10), which in turn translates into a rotation of the vent (e.g., such as the vent 52 shown in FIG. 10) since the current collector is coupled to the vent.

During a venting event of the electrochemical cell, gases from inside the cell will exit through the openings 430 provided between adjacent lobes 422. When exiting the openings 430, the gases exert a pressure on a first side 437 of each of the lobes 422. Because of the offset nature of the trailing edges 436, the pressure exerted on the first sides 437 of the lobes 422 generates rotation of the pushing ring 420.

According to an exemplary embodiment, the rotation of the pushing ring 420 aids in the complete fracture of the vent from the bottom of the electrochemical cell. That is, the rotation or twisting nature of the pushing ring 420 (which translates to the vent) aids the vent in fully separating from the bottom of the cell housing (and not just a partial separation of the vent). According to an exemplary embodiment, the rotation of the pushing ring 420 may be configured for a clockwise motion. However, according to another exemplary embodiment, the rotation of the pushing ring 420 may be configured for a counter-clockwise motion.

Figure 21:
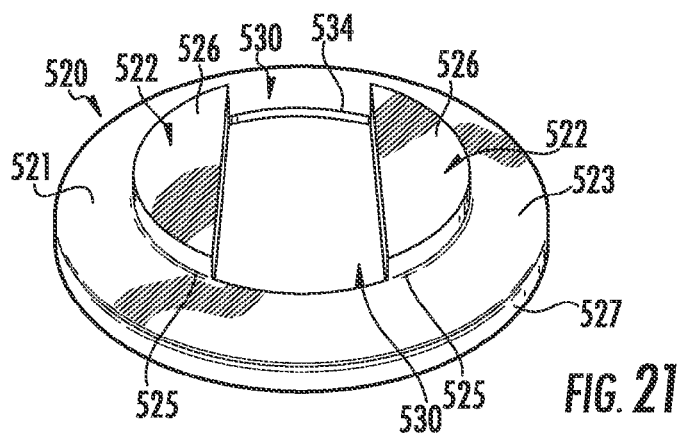
Figure 22:
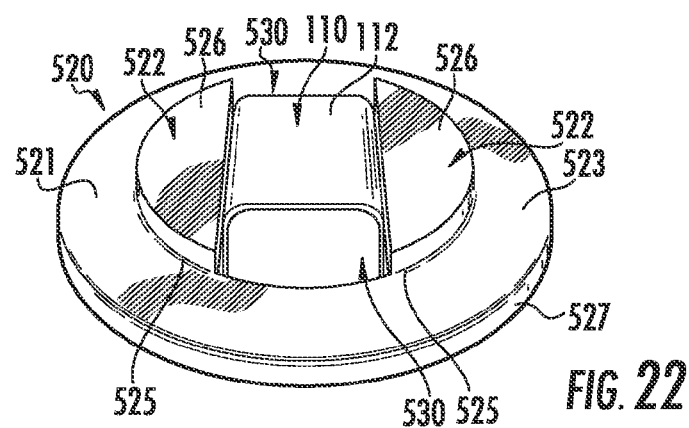
FIG. 22 is a detail perspective view of the pushing ring of FIG. 21 shown provided over a current collector according to an exemplary embodiment.
Figure 23:
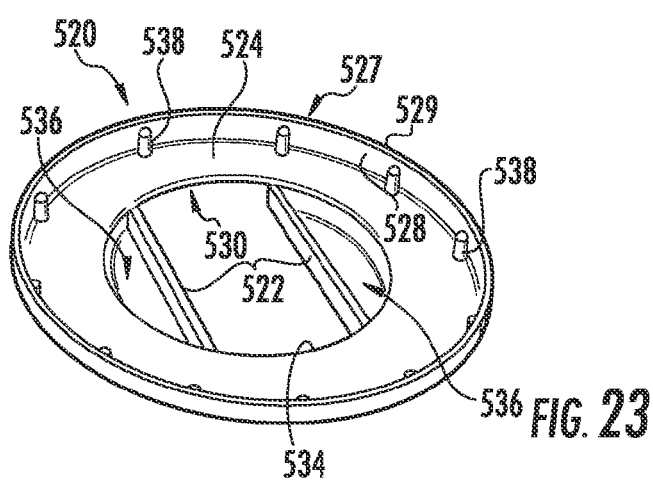
FIG. 23 is a reverse detail perspective view of the pushing ring of FIG. 21 according to an exemplary embodiment.

Referring now to FIGS. 21-23, a pushing ring 520 is shown according to another exemplary embodiment. According to this exemplary embodiment, the pushing ring 520 includes certain features similar to the pushing ring 120 shown in FIGS. 13-17 (with similar features labeled with corresponding reference numbers in the 500 series).

For example, the pushing ring 520 includes a main body 521, a first surface 523 and a second surface 524 opposite the first surface 523. The pushing ring 520 also includes a plurality of lobes 522 extending out and away from the first surface 523 of the main body 521. According to the exemplary embodiment shown in FIGS. 21-23, there are a total of two lobes 522. However, according to other exemplary embodiments, the pushing ring 520 may have a greater or lesser number of lobes 522.

As shown in FIGS. 21-23, the lobes 522 are provided generally opposite from one another. However, according to other exemplary embodiments, the lobes 522 may have a different configuration. According to an exemplary embodiment, the pushing ring 520 includes openings 530 provided between the two lobes 522. The openings 530 are configured to allow gases and/or effluent to exit through the openings 530 during a venting event.

According to the exemplary embodiment shown in FIGS. 21-23, the lobes 522 have a half-moon or half-circle profile and include an end or edge 525 coupled to the first surface 523 of the main body 521 and a surface 526 opposite of the end or edge 525. According to an exemplary embodiment, the surfaces 526 of the lobes 522 are configured to push against the vent of the cell the pushing ring 520 is provided in during a venting event of the cell.

As shown in FIGS. 21-23, the pushing ring 520 includes an extension or ring 527 that extends out and away from the second surface 524. As seen in FIG. 23, the ring 527 includes a first end or edge 528 coupled to the second surface 524 and a second end or edge 529 opposite the first edge 528.

According to an exemplary embodiment, the pushing ring 520 includes features 538 (such as, e.g., shown in FIG. 23) along an inner surface of the ring or extension 527 that project or protrude out and away from the ring or extension 527 to aid in securing the pushing ring 520 to the positive current collector 110 (e.g., to the outside circumference of the main body 111 of the current collector 110). For example, the features 538 may be configured for a slight interference fit with the outside circumference of the main body 111 of the current collector 110. As shown in FIG. 23, the features 538 have a generally cylindrical shape; however, according to other exemplary embodiments, the features 538 may have a different shape.

According to an exemplary embodiment, the main body 521 includes an aperture or opening 534 that is configured to receive the first projection 112 of the current collector 110 (such as, e.g., shown in FIG. 22). As shown in FIGS. 21-23, the opening 534 has a generally rectangular shape having a pair of straight sides or edges (provided opposite one another) and a pair of curved sides or edges (provided opposite one another). However, according to other exemplary embodiments, the opening 534 may have a different shape or configuration.

As seen in FIG. 22, according to an exemplary embodiment, the first projection 112 of the positive current collector 110 extends a predetermined distance out from the surfaces 526 of the lobes 522. This is to create a gap or space between the surfaces 526 of the lobes 522 and the top surface of a vent of an electrochemical cell (such that the lobes 522 do not push on the vent during operation of the cell). However, according to other exemplary embodiments, the first projection 112 of the positive current collector 110 and the surfaces 526 of the lobes 522 of the pushing ring 520 may extend to the same height.

As shown in FIG. 23, according to an exemplary embodiment, the lobes 522 of the pushing ring 520 include hollow spaces 536. The hollow spaces 536 are configured to reduce the amount of material required to produce the pushing ring 520. According to another exemplary embodiment, the lobes 522 may be solid, (i.e., the lobes 522 do not include hollow spaces 536).

Figure 24:
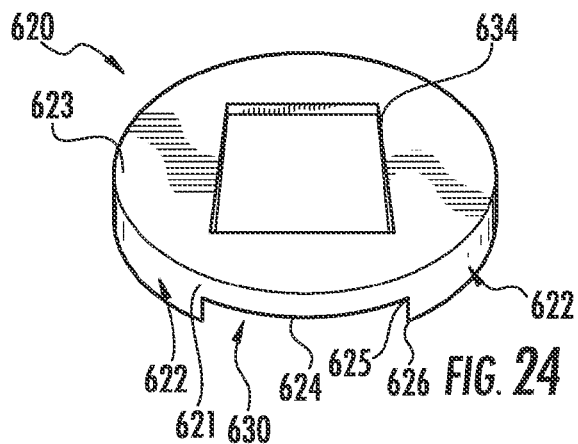
Figure 25:
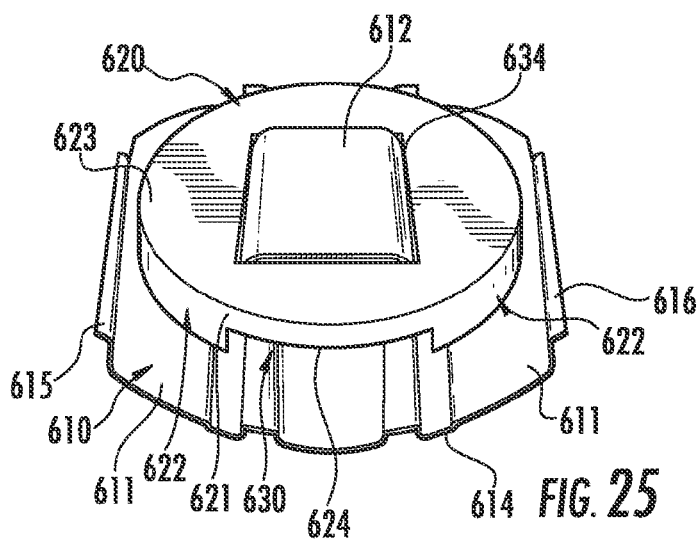
FIG. 25 is a detail perspective view of the pushing ring of FIG. 24 shown provided over a current collector according to an exemplary embodiment.
Figure 26:
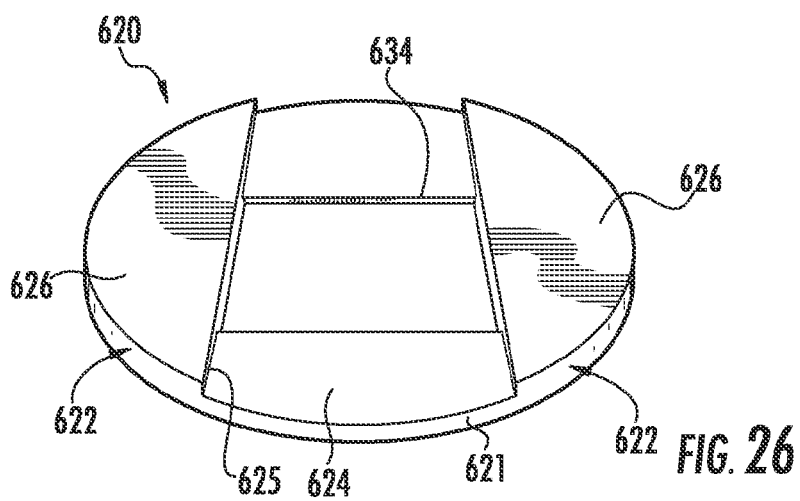
FIG. 26 is a reverse detail perspective view of the pushing ring of FIG. 24 according to an exemplary embodiment.

Referring now to FIGS. 24-26, the pushing ring 620 is shown according to another exemplary embodiment. The pushing ring 620 includes a main body 621 having a first surface 623 and a second surface 624 provided opposite the first surface 623. The main body 621 also includes an aperture or opening 634 shown as a square or rectangular opening in FIGS. 24-26. However, according to other exemplary embodiments, the opening 634 may have a different shape or configuration.

According to an exemplary embodiment, the opening 634 is configured to receive a first projection of a current collector, such as first projection 612 of current collector 610 as shown in FIG. 25. It should be noted that current collector 610 is similar to the current collector 110 shown in FIGS. 13-15 (with similar features to those in FIGS. 13-15 labeled with corresponding reference numbers in the 600 series).

As seen in FIG. 25, according to an exemplary embodiment, the first projection 612 of the positive current collector 610 extends a predetermined distance out from the first surface 623 of the pushing ring 620. This is to create a gap or space between the first surface 623 of the pushing ring 620 and the top surface of a vent of an electrochemical cell (such that the first surface 623 of the pushing ring 620 does not push on the vent during operation of the cell). However, according to other exemplary embodiments, the first projection 612 of the positive current collector 610 and the first surface 623 of the pushing ring 620 may extend to the same height.

According to an exemplary embodiment, the pushing ring 620 includes two lobes 622. However, according to other exemplary embodiments, the pushing ring 620 may have a greater or lesser number of lobes. As shown in FIGS. 24-26, according to an exemplary embodiment, the lobes 622 are provided opposite one another. However, according to other exemplary embodiments, the lobes 622 may have a different configuration.

According to an exemplary embodiment, each of the lobes 622 includes an end or edge 625 coupled to the second surface 624 of the main body 621 and a surface 626 provided opposite of the end 625. According to an exemplary embodiment, the surface 626 has a half-moon or half-circle profile. However, according to other exemplary embodiments, the surface 626 may have another shape or configuration. As shown in FIGS. 24-26, the pushing ring 620 includes openings 630 provided in between the ends of the two lobes 622 such that gases and/or effluent may escape through the opening 630 during a venting event.

Unlike the earlier pushing rings discussed above, the pushing ring 620 has lobes 622 that are in contact with the main body 611 of the current collector 610. Thus, according to this exemplary embodiment, the surface 623 is the surface that would contact the vent (such as, e.g., vent 52) of the electrochemical cell. Thus, the pushing ring 620 provides a full circle of contact between the pushing ring 620 and the vent during a venting event.

According to an exemplary embodiment, the pushing rings described above (e.g., pushing rings 120, 220, 320, 420, 520, and 620) are made from any suitable material, such as, for example, a polyetherimide (PEI), polyethylene, polypropylene, polyetheretherketone (PEEK), polyphenylene sulfide (PPS), etc. or other suitable material. Additionally, according to an exemplary embodiment, the positive current collectors described above (e.g., positive current collectors 110 and 610) are made from any suitable material, such as, for example, aluminum or aluminum alloy, copper or copper alloy, or other suitable material.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the vents, electrochemical cells, and battery modules or systems as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A device for aiding in the fracture of a vent of an electrochemical cell, the device comprising:
   a main body having a first surface; and
   a plurality of lobes extending out from the first surface of the main body such that an open space is provided between adjacent lobes, wherein each of the plurality of lobes make contact with the vent during deployment of the vent such that the vent completely separates from a bottom of the electrochemical cell, wherein the open space provided between adjacent lobes allows gases from inside the electrochemical cell to pass through during deployment of the vent.

2. The device of claim 1, wherein each of the plurality of lobes contacts a portion of an outer edge of the vent during deployment of the vent.

3. The device of claim 2, wherein each of the plurality of lobes comprises a first end coupled to the first surface of the main body and a second end opposite the first end, the second end comprising an edge to contact the vent during deployment of the vent.

4. The device of claim 1, wherein the main body defines an aperture to receive a portion of a current collector therethrough.

5. The device of claim 4, wherein each of the plurality of lobes comprises a leading edge adjacent the aperture defined by the main body and a trailing edge provided a predetermined distance away from the aperture defined by the main body.

6. The device of claim 4, wherein the device comprises a member connecting a top portion of each of the plurality of lobes.

7. The device of claim 4, wherein each of the plurality of lobes is in the shape of a half-circle.

8. The device of claim 1, wherein the main body has a second surface opposite the first surface of the main body and wherein the device further comprises an extension ring extending out and away from the second surface of the main body.

9. The device of claim 8, wherein the extension ring contacts a portion of a wound cell element of the electrochemical cell.

10. The device of claim 8, wherein the second surface of the main body contacts a portion of a current collector of the electrochemical cell.

11. An electrochemical cell, comprising:
    a wound cylindrical cell element;
    a current collector coupled to a bottom end of the wound cylindrical cell element;
    a vent disposed at a bottom of the electrochemical cell; and
    a pushing ring configured to aid in the fracture of the vent, wherein the pushing ring comprises:
      a main body having a first surface, wherein the main body defines an aperture to receive a portion of the current collector therethrough; and
      a plurality of lobes extending out from the first surface of the main body such that an open space is provided between adjacent lobes, wherein each of the plurality of lobes make contact with the vent during deployment of the vent such that the vent completely separates from the bottom of the electrochemical cell, wherein the open space provided between adjacent lobes is configured to allow gases from inside the electrochemical cell to pass through during deployment of the vent.

12. The electrochemical cell of claim 11, wherein the current collector comprises a body and a first projection extending out and away from the body in a first direction toward the vent.

13. The electrochemical cell of claim 12, wherein the first projection has a rectangular surface.

14. The electrochemical cell of claim 12, wherein the current collector comprises a second projection and a third projection, wherein both the second and third projections extend out and away from the body in a second direction opposite the first direction, and wherein the second and third projections of the current collector are coupled to the bottom end of the wound cylindrical cell.

15. The electrochemical cell of claim 11, wherein the current collector comprises a first edge portion having a tip and a second edge portion having a tip, wherein the first and second edge portions extend along an entire length of the body, and wherein the tips of the first and second edge portions contact the main body of the pushing ring.

16. The electrochemical cell of claim 11, wherein the pushing ring comprises an extension ring extending out and away from a second surface of the main body opposite the first surface, wherein the extension ring contacts a portion of the wound cell element.

17. The electrochemical cell of claim 11, wherein the second surface contacts a portion of the current collector.

18. The electrochemical cell of claim 11, wherein each of the plurality of lobes comprises a leading edge adjacent the aperture defined by the main body and a trailing edge provided a predetermined distance away from the aperture defined by the main body.

19. The electrochemical cell of claim 11, wherein the device comprises a member connecting a top portion of each of the plurality of lobes.

20. The electrochemical cell of claim 11, wherein each of the plurality of lobes is in the shape of a half-circle.

21. A method for deploying a vent of an electrochemical cell, comprising:
   forcing a cylindrical cell element of the electrochemical cell in a direction of the vent in response to a pressure increase within the electrochemical cell;
   forcing a current collector in the direction of the vent in response to movement of the cylindrical cell element, wherein the current collector is coupled to the cylindrical cell element; and
   forcing a pushing ring against the vent in response to movement of the current collector, wherein the pushing ring comprises:
      a main body having a first surface, wherein the main body defines an aperture to receive a portion of the current collector therethrough; and
      a plurality of lobes extending out from the first surface of the main body such that an open space is provided between adjacent lobes, wherein each of the plurality of lobes contact the vent to separate the vent from a bottom of the electrochemical cell.

* * * * *